(12) United States Patent
Gao et al.

(10) Patent No.: US 11,996,598 B2
(45) Date of Patent: May 28, 2024

(54) ELECTRONIC DEVICE AND METHOD FOR REDUCING POWER CONSUMPTION OF SIGNAL TRANSMISSION IN ELECTRONIC DEVICE

(71) Applicant: MEDIATEK INC., Hsin-Chu (TW)

(72) Inventors: Li Gao, San Jose, CA (US); Zhiming Deng, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 21 days.

(21) Appl. No.: 18/079,847

(22) Filed: Dec. 12, 2022

(65) Prior Publication Data
US 2023/0299449 A1 Sep. 21, 2023

Related U.S. Application Data

(60) Provisional application No. 63/321,117, filed on Mar. 18, 2022.

(51) Int. Cl.
*H01P 1/00* (2006.01)
(52) U.S. Cl.
CPC ...................................... *H01P 1/00* (2013.01)
(58) Field of Classification Search
None
See application file for complete search history.

(56) References Cited

U.S. PATENT DOCUMENTS

| | | | | |
|---|---|---|---|---|
| 8,432,152 B2* | 4/2013 | de Graauw | ........ | H01Q 21/0075 |
| | | | | 324/76.51 |
| 9,253,875 B2* | 2/2016 | Lent | ........................ | H01P 3/026 |
| 9,526,163 B2* | 12/2016 | Issakov | .................... | H01P 5/028 |
| 10,476,436 B2* | 11/2019 | Kawasaki | ................ | H03B 5/18 |

* cited by examiner

*Primary Examiner* — Jeffrey S Zweizig
(74) *Attorney, Agent, or Firm* — Winston Hsu

(57) ABSTRACT

An electronic device and a method for reducing power consumption of signal transmission in the electronic device are provided. The electronic device may include a source circuit, a destination circuit, at least one transmission wire and at least one resonance wire, wherein the at least one transmission wire is coupled between at least one output terminal of the source circuit and at least one input terminal of the destination circuit, and the at least one resonance wire is coupled to the at least one input terminal of the destination circuit and is routed along the at least one transmission wire. In specific, the source circuit is configured to output an oscillation signal having an oscillation frequency, the destination circuit is configured to receive the oscillation signal, wherein the at least one transmission wire is configured to transmit the oscillation signal from the source circuit to the destination circuit.

20 Claims, 19 Drawing Sheets

ELECTRONIC DEVICE AND METHOD FOR REDUCING POWER CONSUMPTION OF SIGNAL TRANSMISSION IN ELECTRONIC DEVICE

CROSS REFERENCE TO RELATED APPLICATIONS

This application claims the benefit of U.S. Provisional Application No. 63/321,117, filed on Mar. 18, 2022. The content of the application is incorporated herein by reference.

BACKGROUND

The present invention is related to transmission of signals, and more particularly, to an electronic device and a method for reducing power consumption of signal transmission in the electronic device.

In a phase-shifting phased-array system, a signal output from a single source needs to be distributed to many elements which spread over a wide area. Loading caused by the routing over the wide area results in the requirement of power consuming driving circuits, especially for driving high frequency signals in millimeter-wave (mm-Wave) application.

To ensure that the transmitted signal has sufficient voltage swing without greatly increase the power consumption, some methods are proposed in related arts. There are still some disadvantages while adopting these methods, however. For example, the related art may utilize a coil-shape inductor to raise impedance on the signal path, thereby achieving sufficient voltage swing without greatly increasing overall power consumption. However, the coil-shape inductor may occupy a large area, and magnetic coupling introduced by the coil-shape inductor may greatly impact operations of nearby blocks or result in undesired signal leakage, thereby making an overall performance of the system degrade.

Thus, there is a need for a novel method and associated architecture, to solve the problem of the related art without introducing any side effect or in a way that is less likely to introduce side effects.

SUMMARY

An objective of the present invention is to provide an electronic device and a method for reducing power consumption of signal transmission in the electronic device, which can achieve sufficient voltage swing of a transmitted signal without greatly increasing power consumption for driving the transmitted signal.

At least one embodiment of the present invention provides an electronic device. The electronic device may comprise a source circuit, a destination circuit, at least one transmission wire and at least one resonance wire, wherein the at least one transmission wire is coupled between at least one output terminal of the source circuit and at least one input terminal of the destination circuit, and the at least one resonance wire is coupled to the at least one input terminal of the destination circuit and is routed along the at least one transmission wire. In specific, the source circuit is configured to output an oscillation signal having an oscillation frequency, the destination circuit is configured to receive the oscillation signal, wherein the at least one transmission wire is configured to transmit the oscillation signal from the source circuit to the destination circuit.

At least one embodiment of the present invention provides a method for reducing power consumption of signal transmission in an electronic device. The method may comprise: utilizing a source circuit of the electronic device to output an oscillation signal having an oscillation frequency; utilizing at least one transmission wire of the electronic device to transmit the oscillation signal from at least one output terminal of the source circuit to at least one input terminal of at least one destination circuit of the electronic device; and more particularly, at least one resonance wire of the electronic device is coupled to the at least one input terminal of the destination circuit, and is routed along the at least one transmission wire.

The embodiments of the present invention utilize the resonance wire routed along the transmission wire to act as a resonant inductor, which makes the oscillation signal have sufficient voltage swing without greatly increasing power consumption of a buffer for driving the oscillation signal on the transmission wire. In addition, there is no magnetic coupling issue when adopting the proposed resonance wire configuration. Thus, the problem of the related art can be solved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. One skilled in the art will appreciate, electronic equipment manufacturers may refer to the components by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
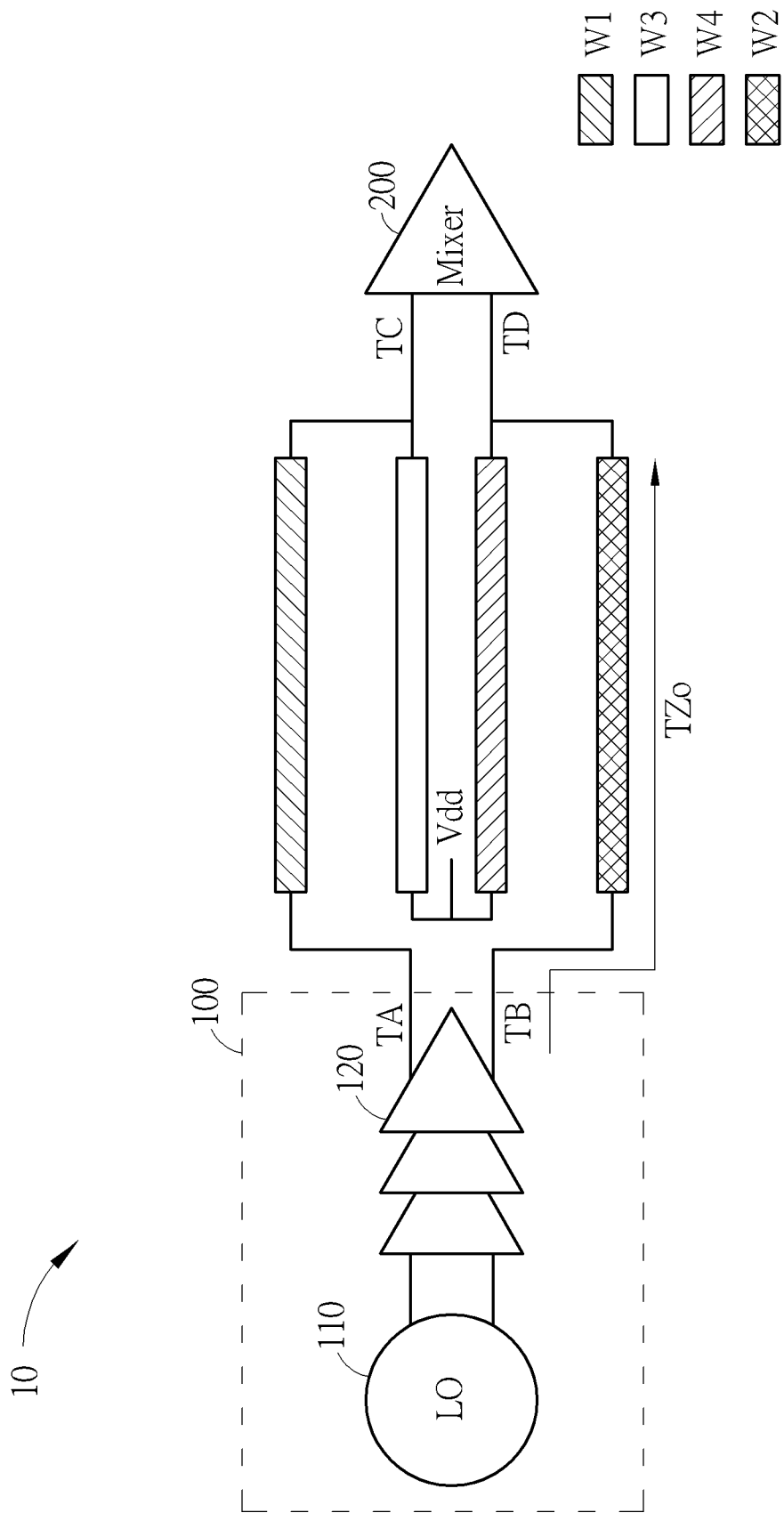
FIG. 1 is a diagram illustrating an electronic device according to an embodiment of the present invention.

FIG. 1 is a diagram illustrating an electronic device 10 according to an embodiment of the present invention, where examples of the electronic device 10 may include, but are not limited to: a receiver, a transmitter and a transceiver. The electronic device may comprise a source circuit 100, a destination circuit such as a mixer 200, at least one transmission wire such as W1 and W2, and at least one resonance wire such as W3 and W4. In this embodiment, the source circuit 100 is configured to output an oscillation signal having an oscillation frequency. More particularly, the source circuit 120 may comprise a local oscillator (LO) 110 and a buffer circuit 120 coupled to the LO 110, where the LO 110 is configured to generate the oscillation signal, and the buffer circuit 120 is configured to drive the oscillation signal on transmission wires. In addition, the transmission wires W1 and W2 are coupled between at least one output terminal such as TA and TB of the source circuit 100 (e.g., the buffer circuit 120 therein) and at least one input terminal such as TC and TD of the mixer 200. The mixer 200 is configured to receive the oscillation signal, and more particularly, to perform up-conversion or down-conversion according to the oscillation signal. The transmission wires are configured to transmit the oscillation signal from the source circuit 100 to the mixer 200, where the resonance wires W3 may be routed along the transmission wire W1, and the resonance wire W4 may be routed along the transmission wires W2. For example, at least one portion (e.g., a portion or all) of the resonance wires W3 may be routed in the same direction of the transmission wire W1 (e.g., following the routing trace of the transmission wire W1), and at least one portion (e.g., a portion or all) of the resonance wire W4 may be routed along the transmission wires W2 (e.g., following the routing trace of the transmission wire W2), but the present invention is not limited thereto.

In this embodiment, a capacitance on the at least one input terminal of the destination circuit (e.g., an equivalent capacitance introduced by overall routing between the buffer circuit 120 and the mixer 200 under a differential architecture of the electronic device 10) and an inductance introduced by the at least one resonance wire (e.g., an equivalent inductance across the input terminals TC and TD of the mixer 200) may form a resonant tank corresponding to the oscillation frequency. The resonant tank can raise the transimpedance $TZ_O$ from the output of buffer circuit 120 (e.g., TA and TB) to the input of mixer 200 (e.g., TC and TD) at the oscillation frequency, thereby enhancing voltage swing of the oscillation signal at the input terminals TC and TD of mixer 200. In comparison with utilizing a typical coil-shaped inductor coupled between the input terminals TC and TD of the mixer 200, area cost introduced by the proposed resonance wires W3 and W4 can be greatly reduced. Most importantly, as currents on the transmission wire W1 and the resonance wire W3 flow in opposite directions, a magnetic field introduced by the transmission wire W1 and a magnetic field introduced by the resonance wire W3 can be canceled by each other. As currents on the transmission wire W2 and the resonance wire W4 flow in opposite directions, a magnetic field introduced by the transmission wire W2 and a magnetic field introduced by the resonance wire W4 can be canceled by each other. As the currents on the resonance wire W3 and the resonance wire W4 flow in opposite directions, the magnetic field introduced by the resonance wire W3 and the magnetic field introduced by the resonance wire W4 can be canceled by each other. As the currents on the transmission wire W1 and the transmission wire W2 flow in opposite directions, the magnetic field introduced by the transmission wire W1 and the magnetic field introduced by the transmission wire W2 can be canceled by each other. Thus, the resonance wires W3 and W4 which provides the inductance of the resonant tank will not introduce magnetic interference to nearby circuit blocks.

In this embodiment, a first end (e.g., a right-side end shown in FIG. 1) of the resonance wire W3 is coupled to the input terminal TC of the mixer 200, and a second end (e.g., a left-side end shown in FIG. 1) of resonance wire W3 is coupled to a reference voltage terminal. A first end (e.g., a right-side end shown in FIG. 1) of the resonance wire W4 is coupled to the input terminal TD of the mixer 200, and a second end (e.g., a left-side end shown in FIG. 1) of resonance wire W4 is coupled to the reference voltage terminal. In this embodiment, the reference voltage terminal may be a power voltage terminal Vdd which provides power of the source circuit 100 (e.g., the buffer circuit 120 therein), but the present invention is not limited thereto. In some embodiment, the reference voltage terminal may be a terminal other than the power voltage terminal Vdd, but the present invention is not limited thereto. In some embodiment, the second end of the resonance wire W3 and the second end of the resonance wire W4 may be coupled to each other and be floating (e.g., without connecting to any reference voltage terminal), but the present invention is limited thereto.

Figure 2:
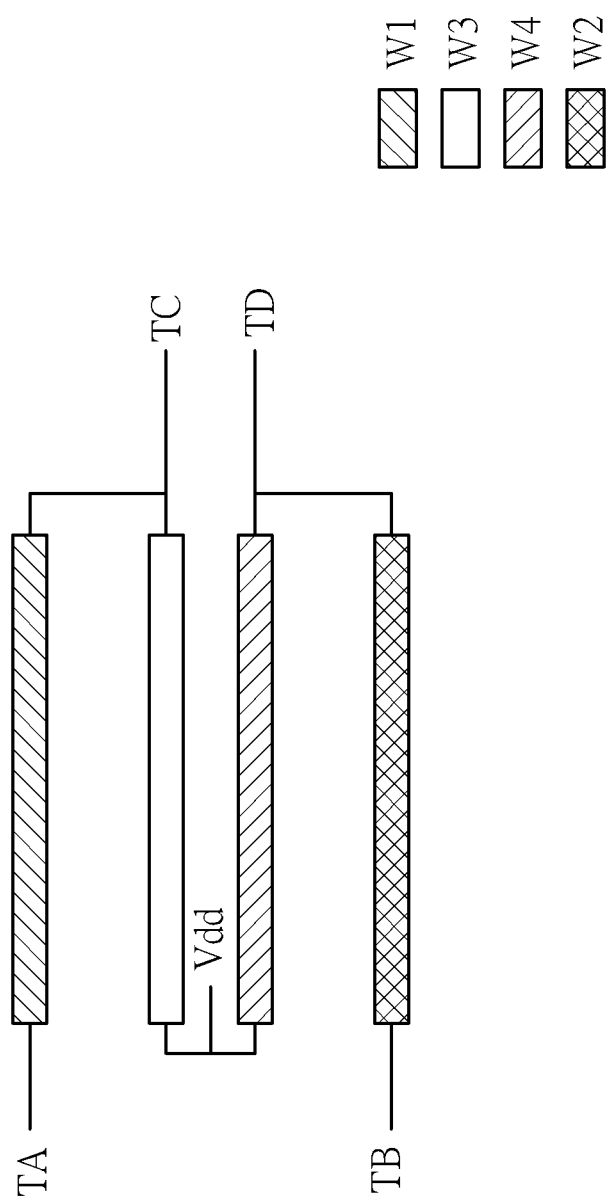
FIG. 2 is a diagram illustrating an example of a layout of transmission wires and resonance wires according to an embodiment of the present invention.

FIG. 2 is a diagram illustrating an example of a layout of the transmission wires W1 and W2 and the resonance wires W3 and W4 according to an embodiment of the present invention. As shown in FIG. 2, the transmission wire W1 may be partially or completely parallel to the resonance wire W3, and the transmission wire W2 may be partially or completely parallel to the resonance wire W4. In addition, a length of the transmission wire W1 may be identical to a length of the resonance wire W3, and a length of the transmission wire W2 may be identical to a length of the resonance wire W4. In this embodiment, there is no coupling effect between the transmission wire W1 and the resonance wire W3, as the transmission wire W1 and the resonance wire W3 may be apart from each other over a sufficient distance to prevent coupling from taking effect. Similarly, there is no coupling effect between the transmission wire W2 and the resonance wire W4, as the transmission wire W2 and the resonance wire W4 may be apart from each other over a sufficient distance to prevent coupling from taking effect. However, the transmission wire W1 shall be close enough in distance to the transmission wire W2 and the resonance wire W3 shall be close enough in distance to the resonance wire W4. Then coupling from the transmission wires W1 and W2 to other blocks can still be cancelled, and coupling from the resonance wires W3 and W4 to other blocks can also be cancelled.

Figure 3:
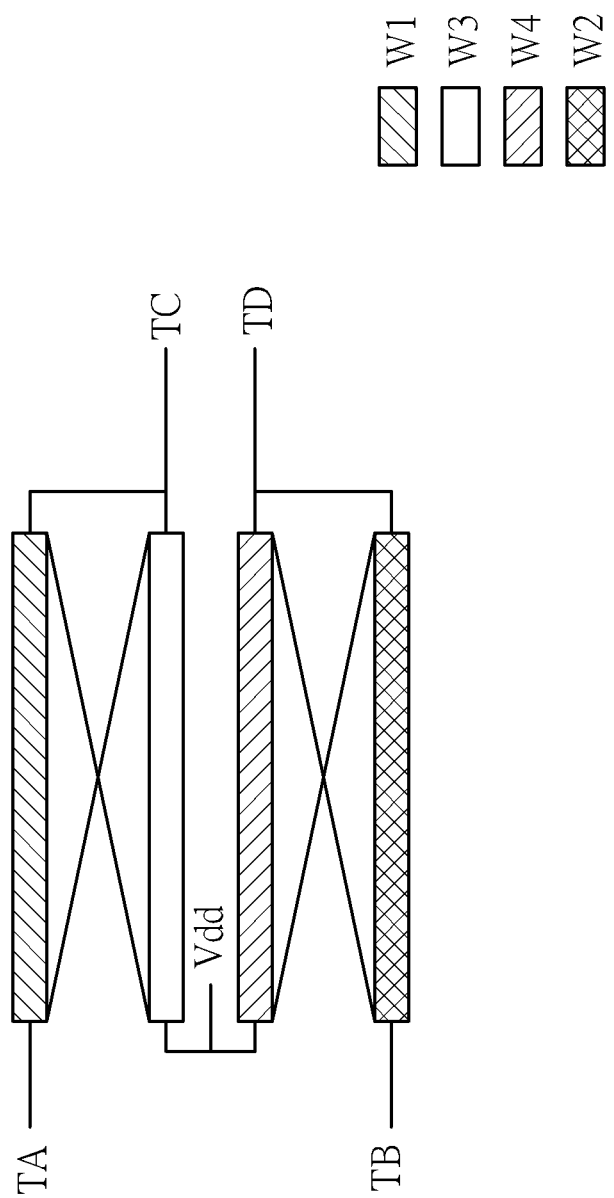
FIG. 3 is a diagram illustrating an example of a layout of transmission wires and resonance wires according to an embodiment of the present invention.

FIG. 3 is a diagram illustrating an example of a layout of the transmission wires W1 and W2 and the resonance wires W3 and W4 according to an embodiment of the present invention. In comparison with the layout shown in FIG. 2, there is a coupling effect between the transmission wire W1 and the resonance wire W3 (illustrated by two intersecting lines between the transmission wire W1 and the resonance wire W3) in the embodiment of FIG. 3, as the transmission wire W1 and the resonance wire W3 may be close to each other. Similarly, there is a coupling effect between the transmission wire W2 and the resonance wire W4 (illustrated by two intersecting lines between the transmission wire W2 and the resonance wire W4) in the embodiment of FIG. 3, as the transmission wire W2 and the resonance wire W4 may be close to each other. Even though there are coupling effects mentioned above, the benefits of configuring the resonance wires W3 and W4 mentioned in previous embodiments still exist in this embodiment. The relationship between W1 and W2 and the relationship between W3 and W4 are the same as that in FIG. 2.

Figure 4:
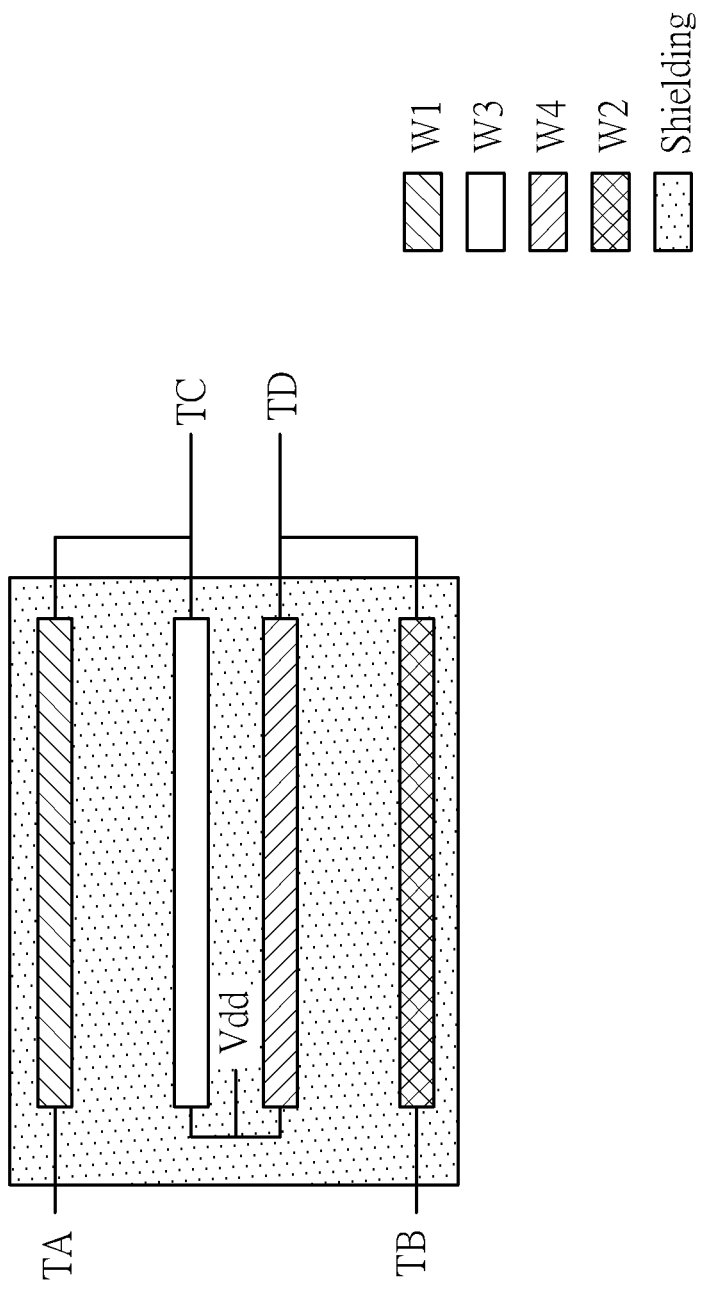
FIG. 4 is a diagram illustrating an example of a layout of transmission wires and resonance wires according to an embodiment of the present invention.
Figure 5:
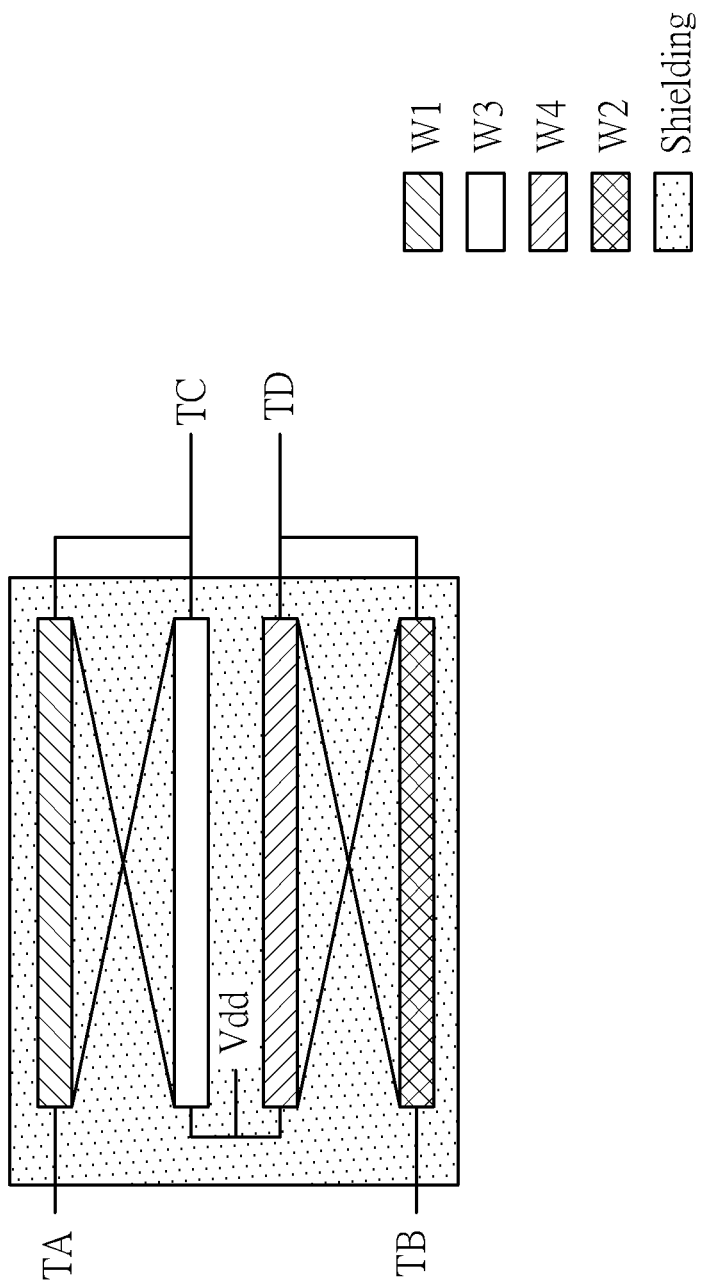
FIG. 5 is a diagram illustrating an example of a layout of transmission wires and resonance wires according to an embodiment of the present invention.

FIG. 4 is a diagram illustrating an example of a layout of the transmission wires W1 and W2 and the resonance wires W3 and W4 according to an embodiment of the present invention. In comparison with the layout shown in FIG. 2, a shielding layer may be placed above or below the transmission wires W1/W2 and the resonance wires W3/W4. With being guarded by this shielding layer, other circuit blocks or wires other than the transmission wires W1/W2 and the resonance wires W3/W4 may be routed across the transmission wires W1/W2 and the resonance wires W3/W4 without being interfered, but the present invention is not limited thereto. Furthermore, the shielding layer may be added into the layout shown in FIG. 3, as shown in FIG. 5.

Figure 6:
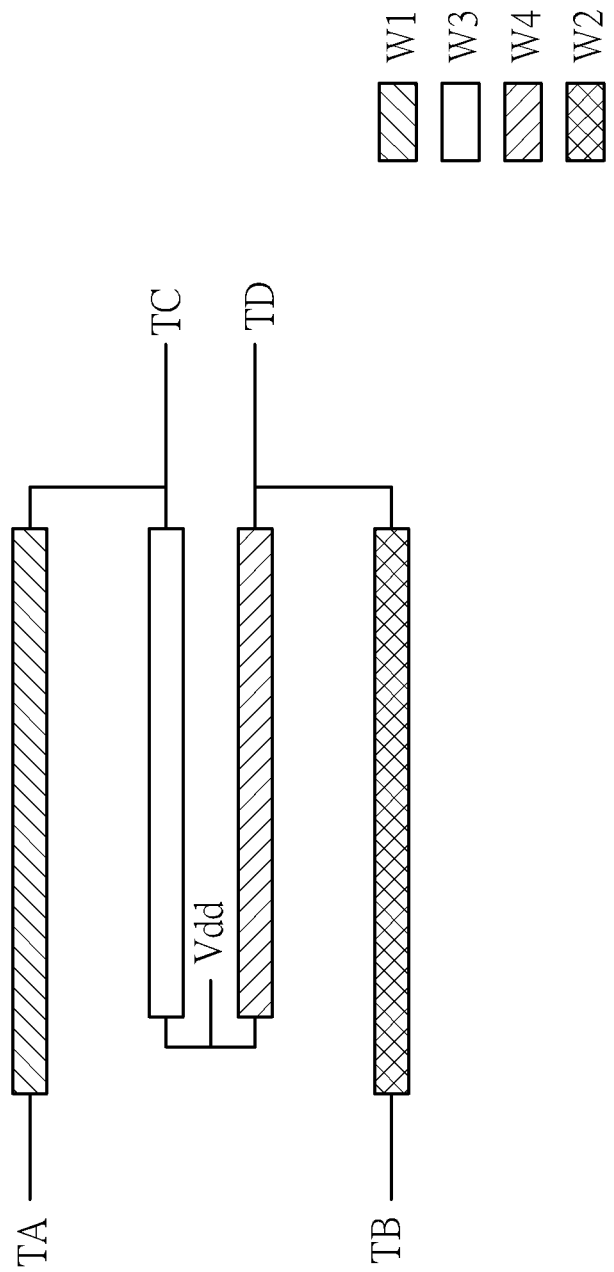
FIG. 6 is a diagram illustrating an example of a layout of transmission wires and resonance wires according to an embodiment of the present invention.

FIG. 6 is a diagram illustrating an example of a layout of the transmission wires W1 and W2 and the resonance wires W3 and W4 according to an embodiment of the present invention. In comparison with the layout shown in FIG. 2, the length of the transmission wire W1 may be different, longer or shorter, from the length of the resonance wire W3, and the length of the transmission wire W2 may be different, longer or shorter, from the length of the resonance wire W4.

Figure 7:
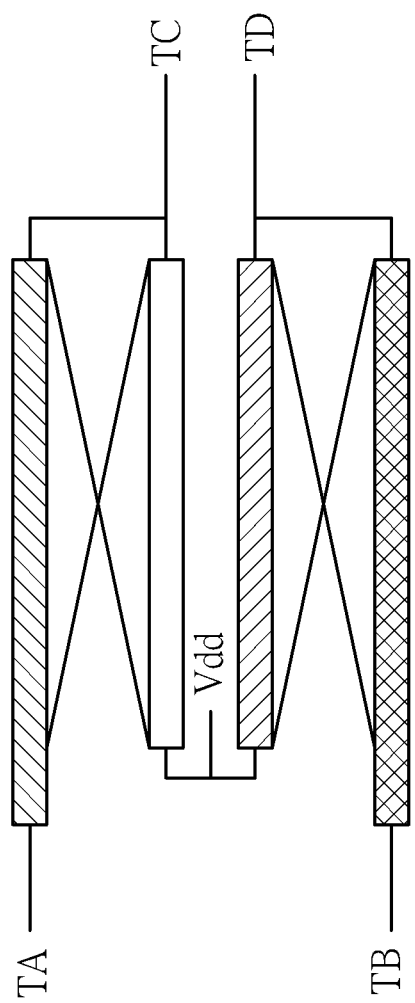
FIG. 7 is a diagram illustrating an example of a layout of transmission wires and resonance wires according to an embodiment of the present invention.

FIG. 7 is a diagram illustrating an example of a layout of the transmission wires W1 and W2 and the resonance wires W3 and W4 according to an embodiment of the present invention. In comparison with the layout shown in FIG. 6, there is the coupling effect between the transmission wire W1 and the resonance wire W3 (illustrated by two intersecting lines between the transmission wire W1 and the resonance wire W3) in the embodiment of FIG. 7, as the transmission wire W1 and the resonance wire W3 may be close to each other. Similarly, there is the coupling effect between the transmission wire W2 and the resonance wire W4 (illustrated by two intersecting lines between the transmission wire W2 and the resonance wire W4) in the embodiment of FIG. 7, as the transmission wire W2 and the resonance wire W4 may be close to each other.

Figure 8:
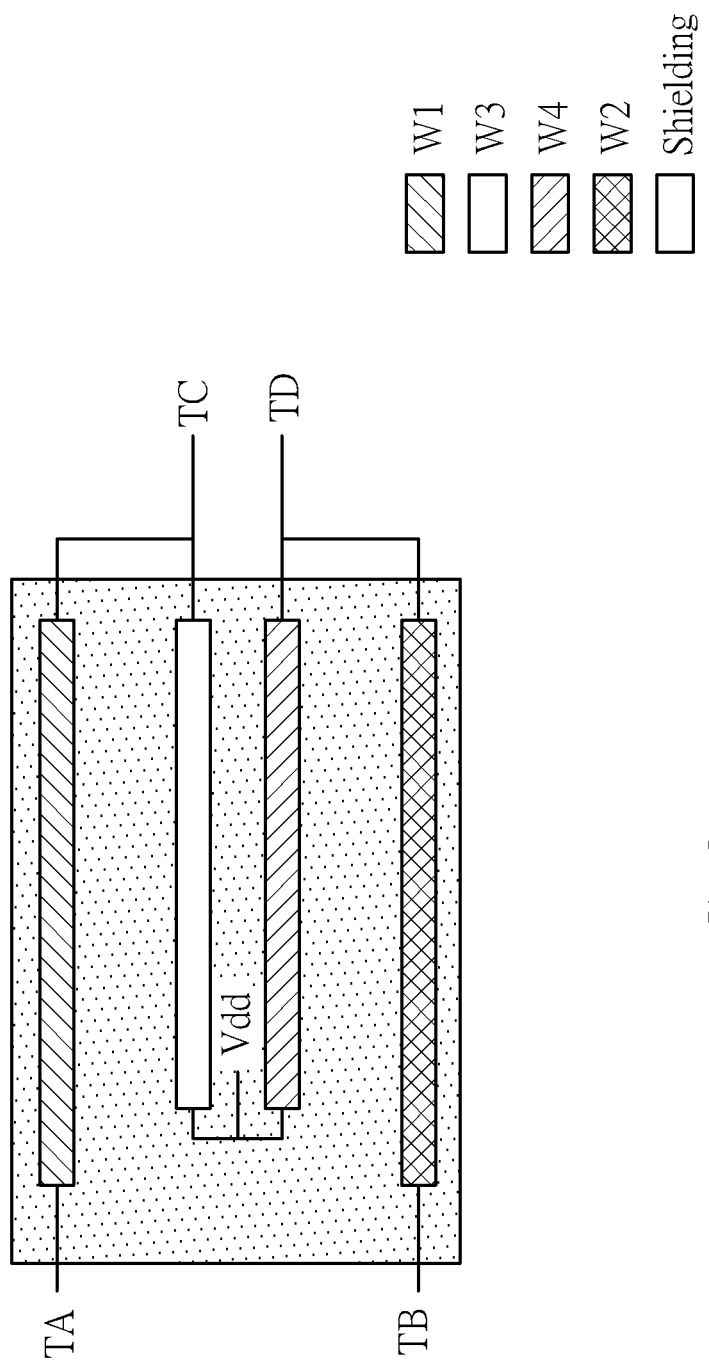
FIG. 8 is a diagram illustrating an example of a layout of transmission wires and resonance wires according to an embodiment of the present invention.
Figure 9:
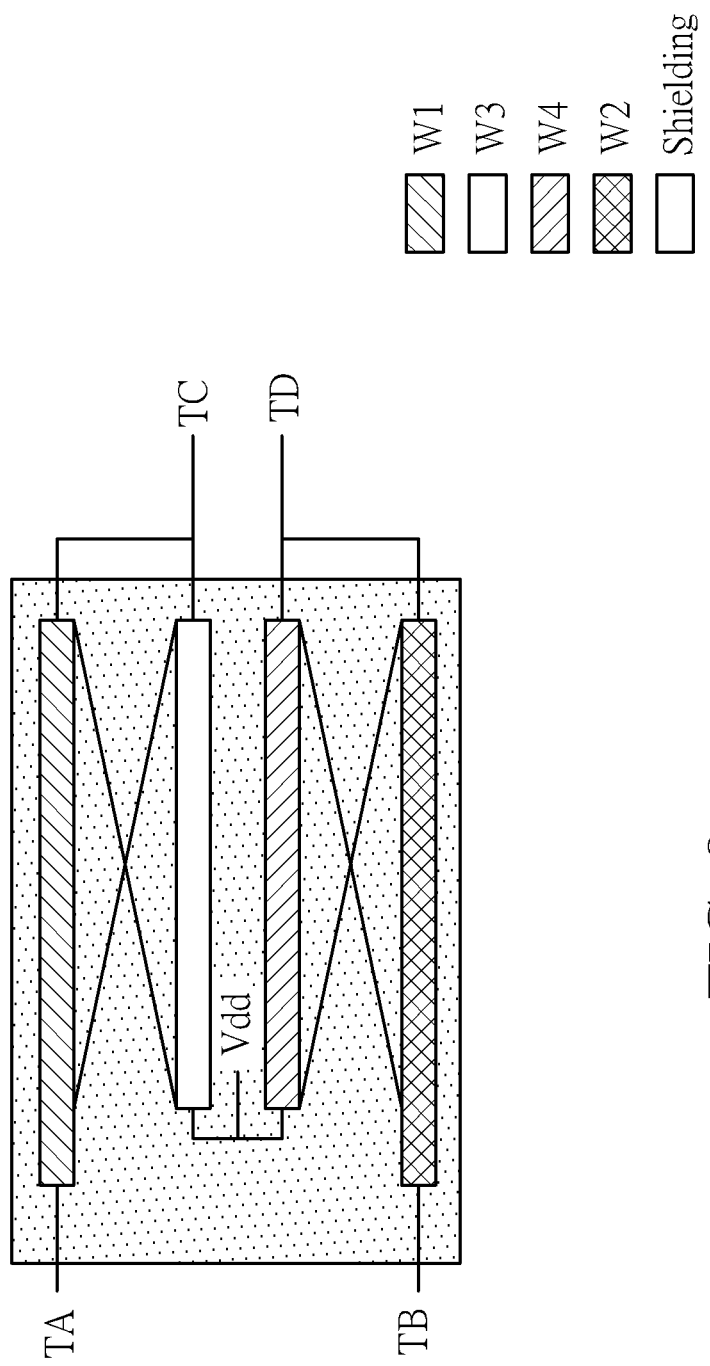
FIG. 9 is a diagram illustrating an example of a layout of transmission wires and resonance wires according to an embodiment of the present invention.

FIG. 8 is a diagram illustrating an example of a layout of the transmission wires W1 and W2 and the resonance wires W3 and W4 according to an embodiment of the present invention. In comparison with the layout shown in FIG. 6, the shielding layer may be placed above or below the transmission wires W1/W2 and the resonance wires W3/W4. Furthermore, the shielding layer may be added into the layout shown in FIG. 7, as shown in FIG. 9.

Figure 10:
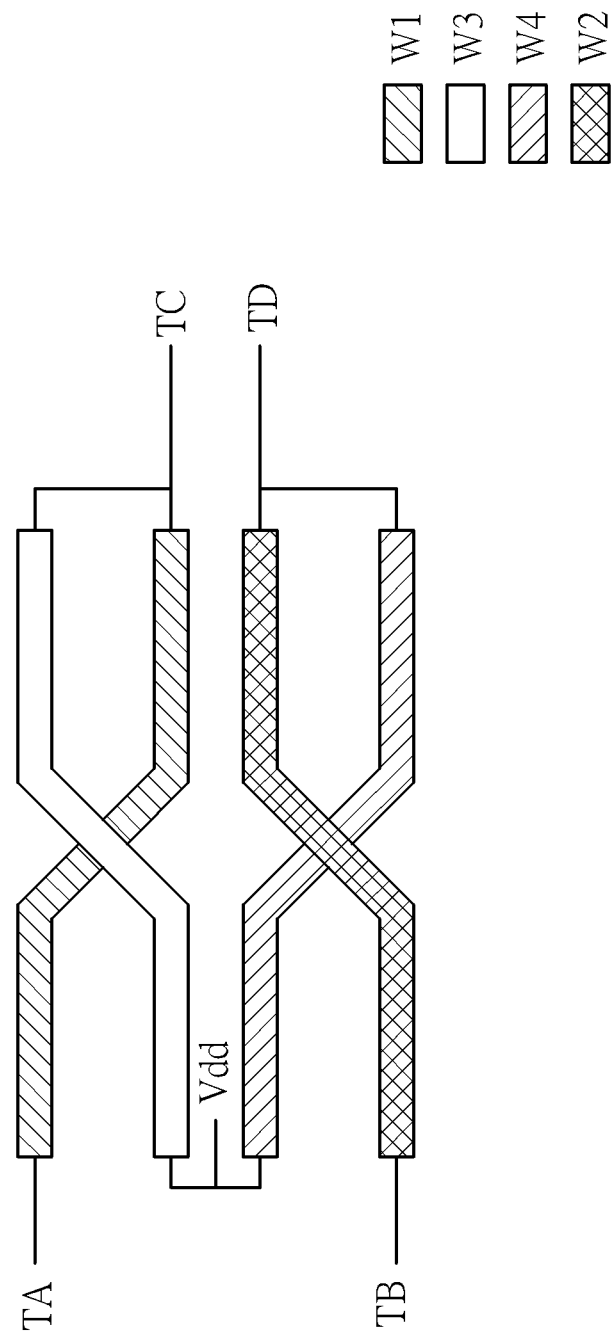
FIG. 10 is a diagram illustrating an example of a layout of transmission wires and resonance wires according to an embodiment of the present invention.

FIG. 10 is a diagram illustrating an example of a layout of the transmission wires W1 and W2 and the resonance wires W3 and W4 according to an embodiment of the present invention. As shown in FIG. 10, a first segment (a right-side segment shown in FIG. 10) of the resonance wire W3 is routed on a first side (e.g., an upper side shown in FIG. 10) of the transmission wire W1, and a second segment (e.g., a left-side segment) of the resonance wire W3 is routed on a second side (e.g., a lower side shown in FIG. 10) of the transmission wire W1, where an intermediate segment of the resonance wire W3 (which is connected between the first segment and the second segment of the resonance wire W3) may cross the transmission wire W1. In addition, a first segment (a right-side segment shown in FIG. 10) of the resonance wire W4 is routed on a first side (e.g., a lower side shown in FIG. 10) of the transmission wire W2, and a second segment (e.g., a left-side segment) of the resonance wire W4 is routed on a second side (e.g., an upper side shown in FIG. 10) of the transmission wire W2, where an intermediate segment of the resonance wire W4 (which is connected between the first segment and the second segment of the resonance wire W4) may cross the transmission wire W2. In this embodiment, there is no coupling effect between the transmission wire W1 and the resonance wire W3, as the transmission wire W1 and the resonance wire W3 may be apart from each other over a sufficient distance to prevent coupling from taking effect. Similarly, there is no coupling effect between the transmission wire W2 and the resonance wire W4, as the transmission wire W2 and the resonance wire W4 may be apart from each other over a sufficient distance to prevent coupling from taking effect.

Figure 11:
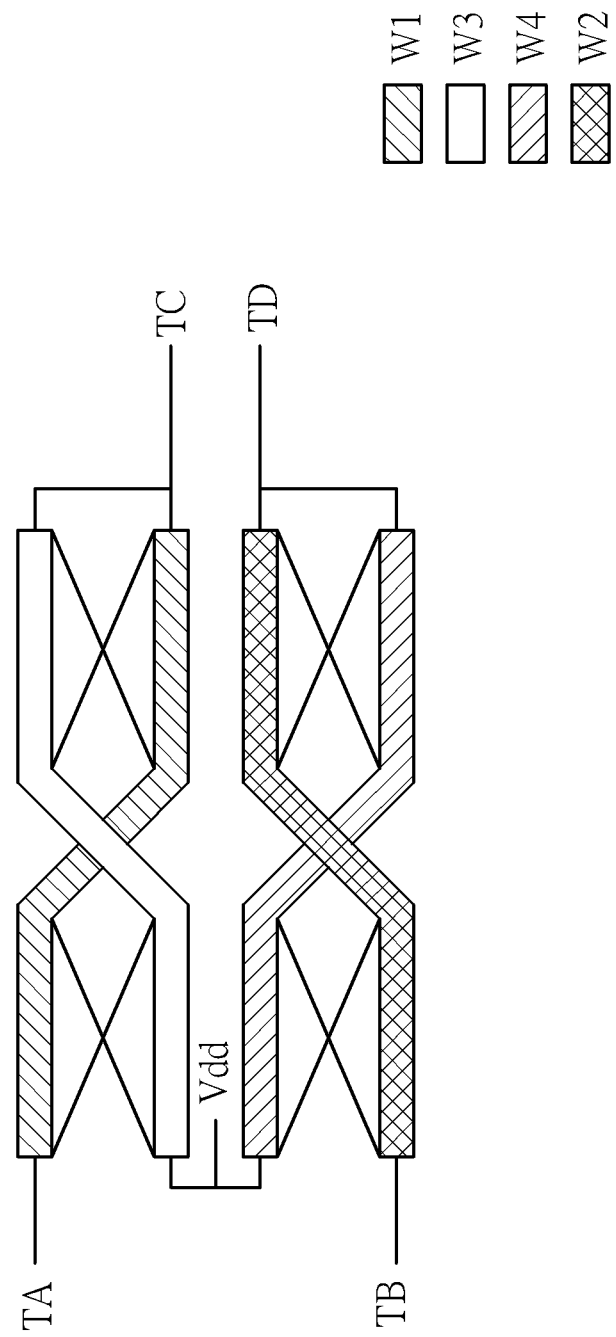
FIG. 11 is a diagram illustrating an example of a layout of transmission wires and resonance wires according to an embodiment of the present invention.

FIG. 11 is a diagram illustrating an example of a layout of the transmission wires W1 and W2 and the resonance wires W3 and W4 according to an embodiment of the present invention. In comparison with the layout shown in FIG. 10, there is coupling effects between the transmission wire W1 and the resonance wire W3 (illustrated by two intersecting lines between the transmission wire W1 and the first segment of the resonance wire W3 and two intersecting lines between the transmission wire W1 and the second segment of the resonance wire W3) in the embodiment of FIG. 11, as the transmission wire W1 and the resonance wire W3 may be close to each other. Similarly, there is a coupling effect between the transmission wire W2 and the resonance wire W4 (illustrated by two intersecting lines between the transmission wire W2 and the first segment of the resonance wire W4 and two intersecting lines between the transmission wire W2 and the second segment of the resonance wire W4) in the embodiment of FIG. 11, as the transmission wire W2 and the resonance wire W4 may be close to each other. As mentioned in the embodiment of FIG. 3, even though there are coupling effects, the benefits of configuring the resonance wires W3 and W4 mentioned in previous embodiments still exist in this embodiment.

Figure 12:
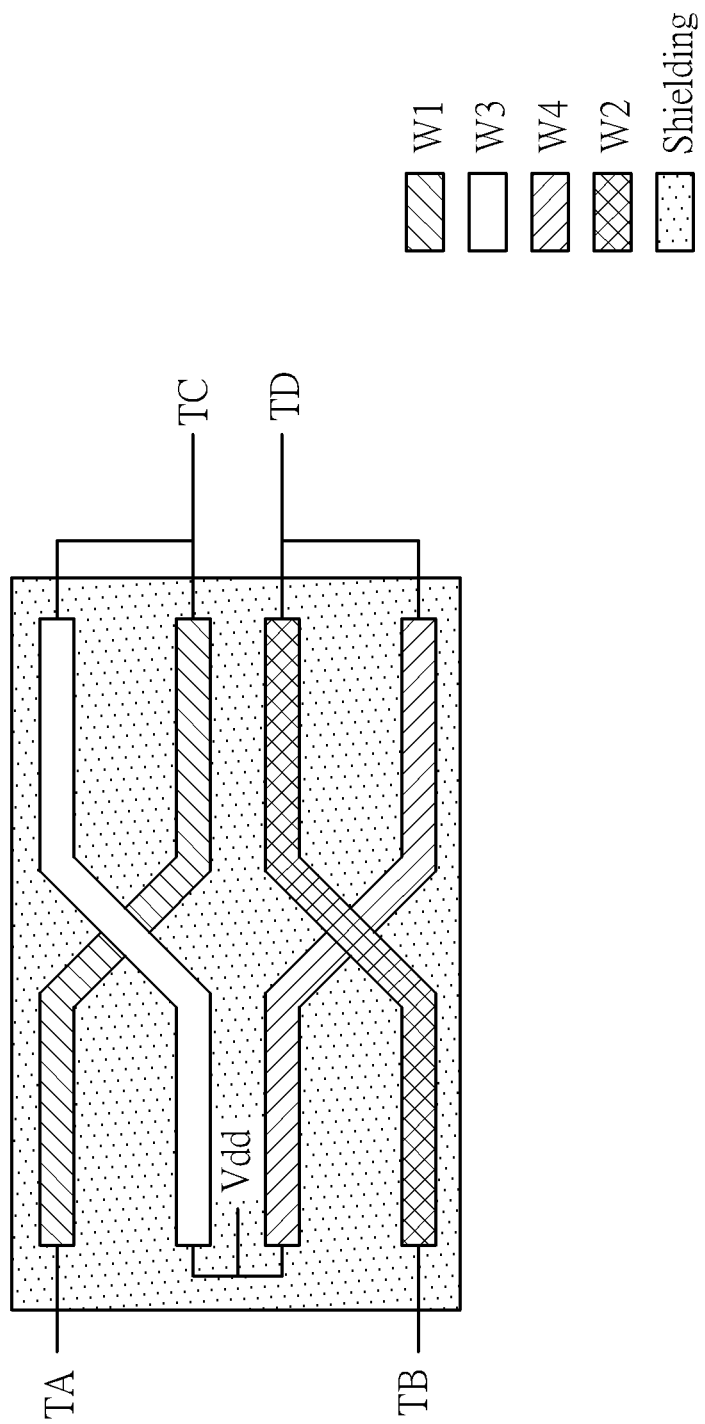
FIG. 12 is a diagram illustrating an example of a layout of transmission wires and resonance wires according to an embodiment of the present invention.
Figure 13:
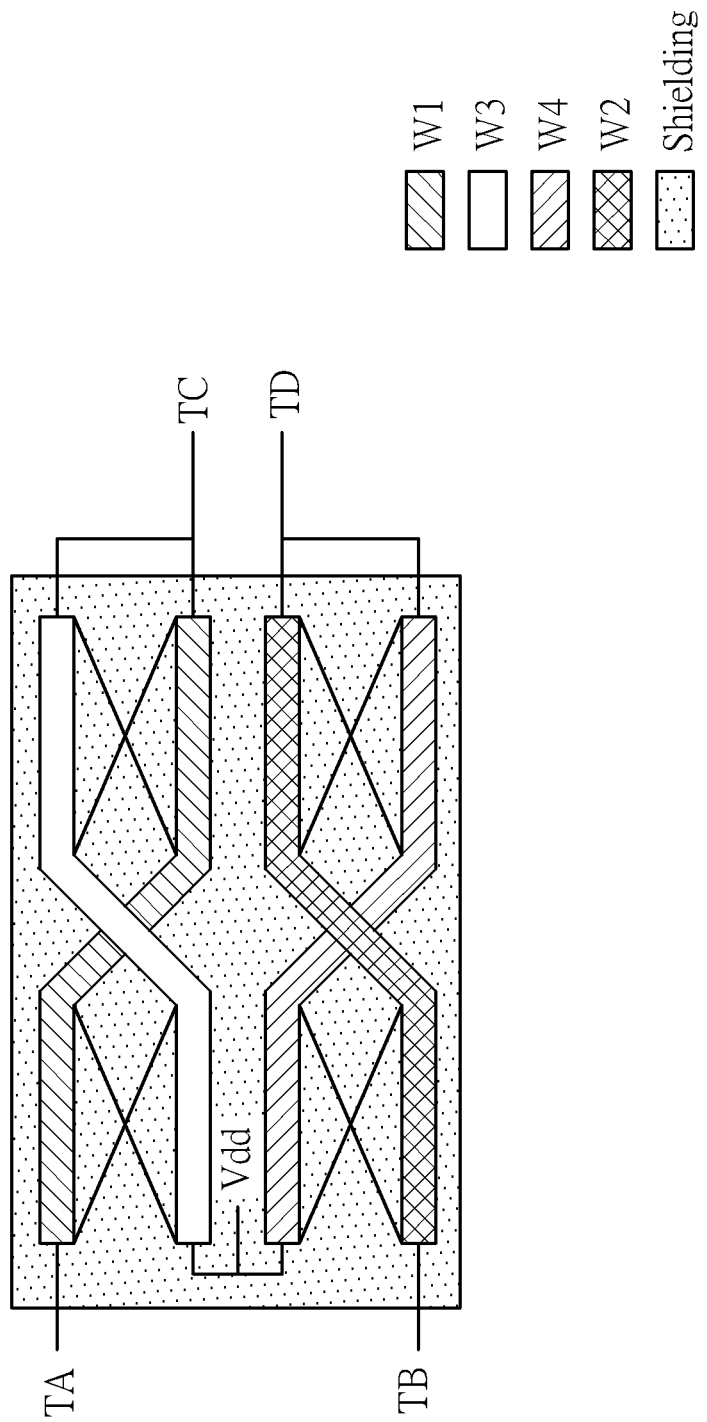
FIG. 13 is a diagram illustrating an example of a layout of transmission wires and resonance wires according to an embodiment of the present invention.

FIG. 12 is a diagram illustrating an example of a layout of the transmission wires W1 and W2 and the resonance wires W3 and W4 according to an embodiment of the present invention. In comparison with the layout shown in FIG. 10, a shielding layer may be placed above or below the transmission wires W1/W2 and the resonance wires W3/W4. With being guarded by this shielding layer, other circuit blocks or wires other than the transmission wires W1/W2 and the resonance wires W3/W4 may be routed across the transmission wires W1/W2 and the resonance wires W3/W4 without being interfered, but the present invention is not limited thereto. Furthermore, the shielding layer may be added into the layout shown in FIG. 11, as shown in FIG. 13.

Figure 14:
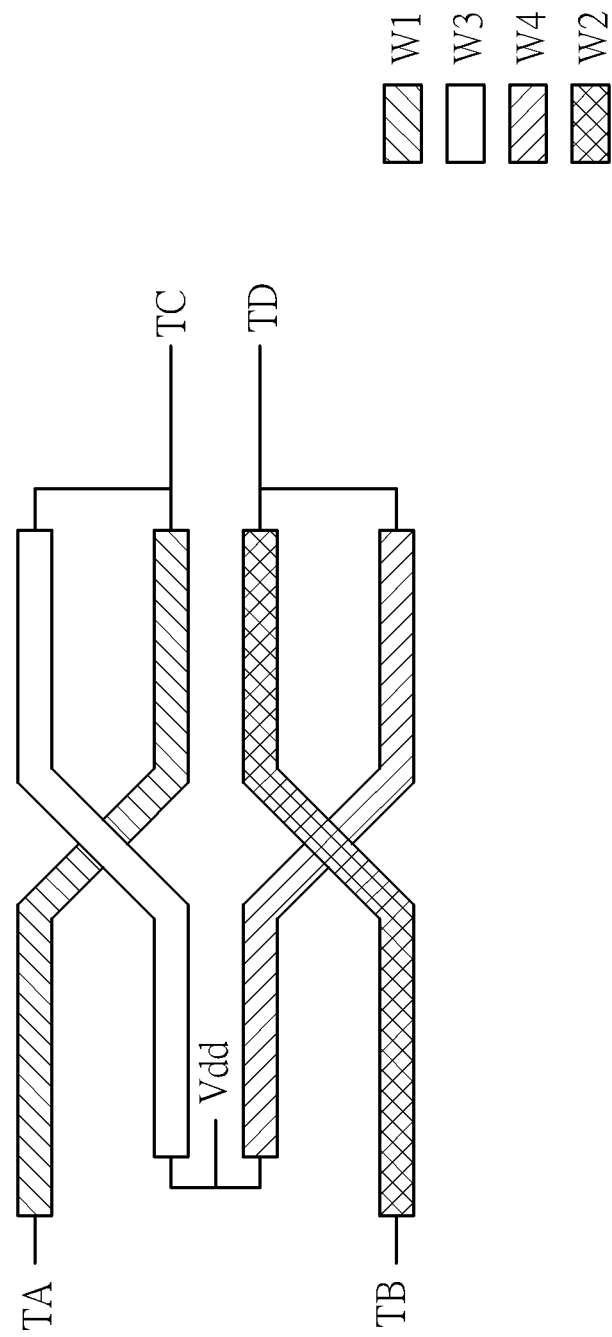
FIG. 14 is a diagram illustrating an example of a layout of transmission wires and resonance wires according to an embodiment of the present invention.

FIG. 14 is a diagram illustrating an example of a layout of the transmission wires W1 and W2 and the resonance wires W3 and W4 according to an embodiment of the present invention. In comparison with the layout shown in FIG. 10, the length of the transmission wire W1 may be different from the length of the resonance wire W3, and the length of the transmission wire W2 may be different from the length of the resonance wire W4.

Figure 15:
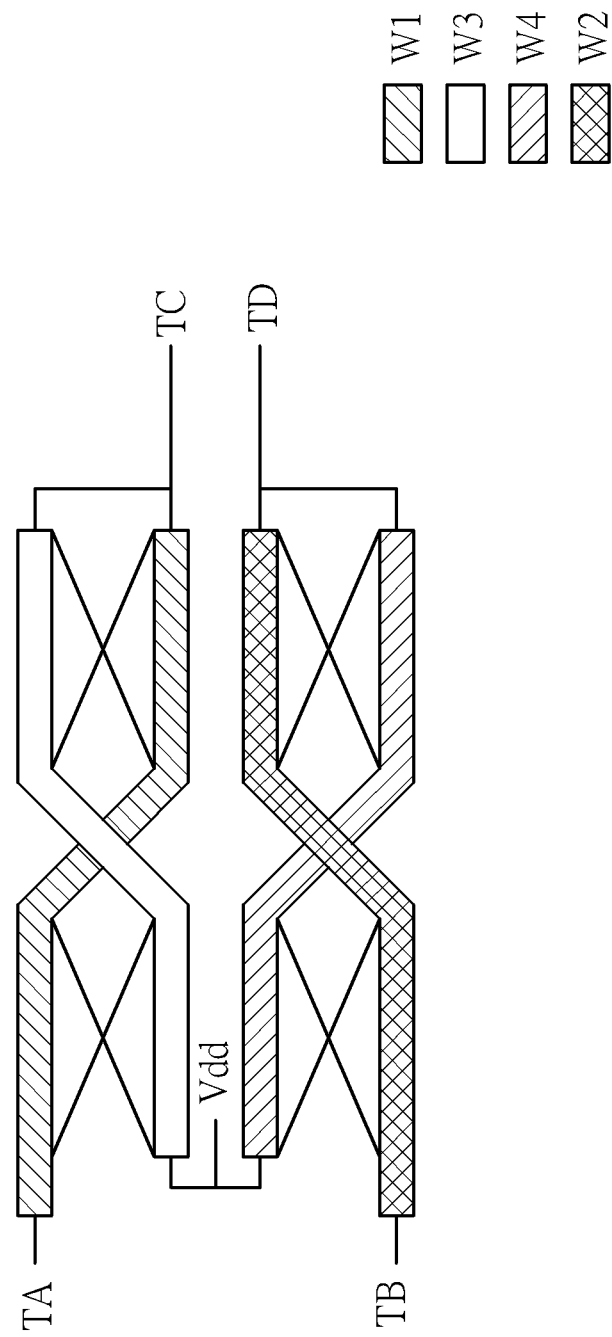
FIG. 15 is a diagram illustrating an example of a layout of transmission wires and resonance wires according to an embodiment of the present invention.

FIG. 15 is a diagram illustrating an example of a layout of the transmission wires W1 and W2 and the resonance wires W3 and W4 according to an embodiment of the present invention. In comparison with the layout shown in FIG. 14, there is the coupling effect between the transmission wire W1 and the resonance wire W3 (illustrated by two intersecting lines between the transmission wire W1 and the first segment of the resonance wire W3 and two intersecting lines between the transmission wire W1 and the second segment of the resonance wire W3) in the embodiment of FIG. 15, as the transmission wire W1 and the resonance wire W3 may be close to each other. Similarly, there is the coupling effect between the transmission wire W2 and the resonance wire W4 (illustrated by two intersecting lines between the transmission wire W2 and the first segment of the resonance wire W4 and two intersecting lines between the transmission wire W2 and the second segment of the resonance wire W4) in the embodiment of FIG. 15, as the transmission wire W2 and the resonance wire W4 may be close to each other.

Figure 16:
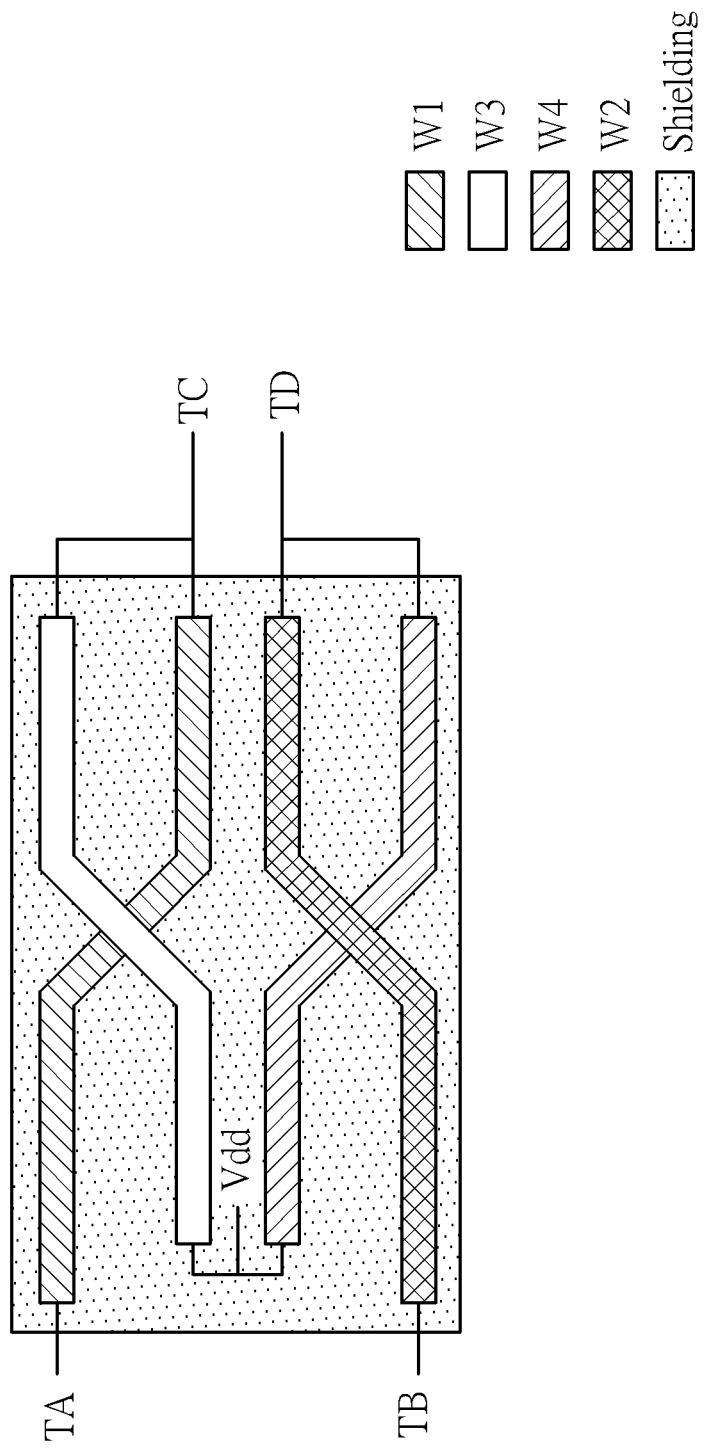
FIG. 16 is a diagram illustrating an example of a layout of transmission wires and resonance wires according to an embodiment of the present invention.
Figure 17:
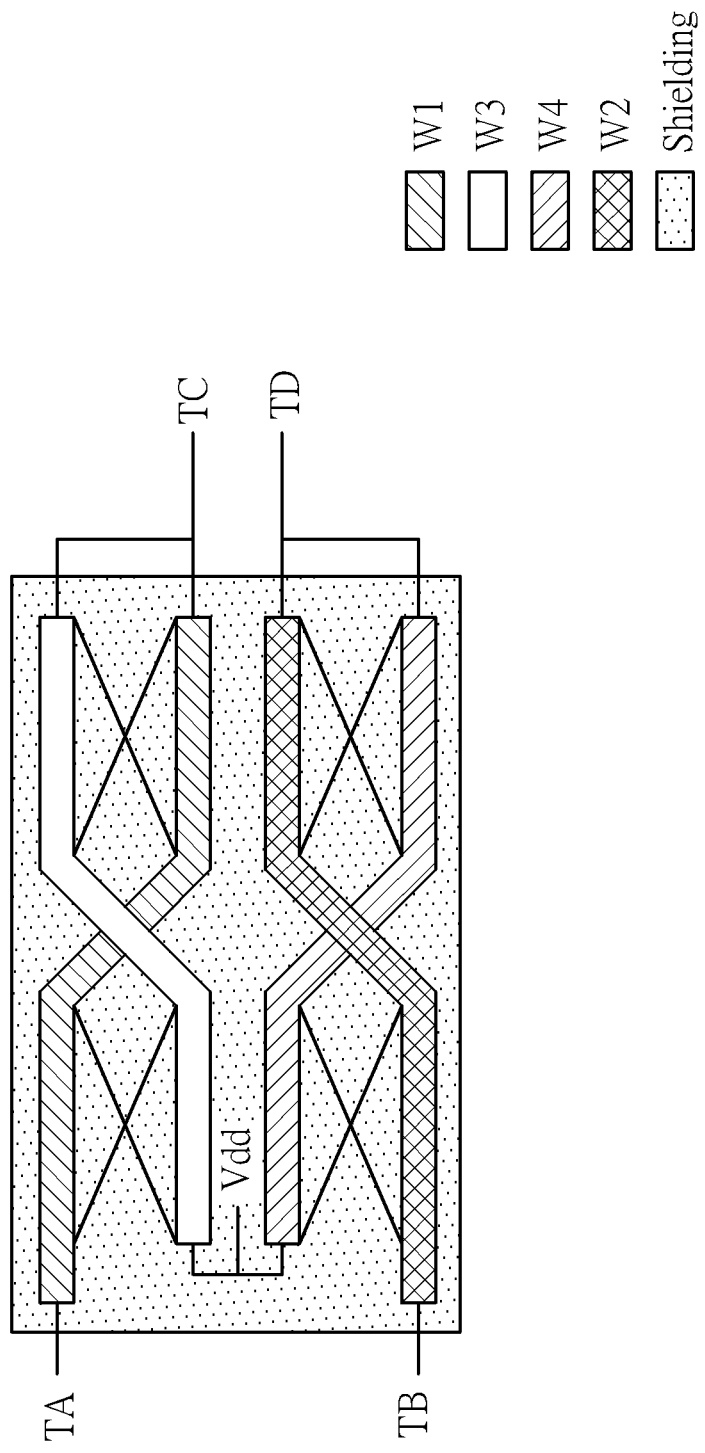
FIG. 17 is a diagram illustrating an example of a layout of transmission wires and resonance wires according to an embodiment of the present invention.

FIG. 16 is a diagram illustrating an example of a layout of the transmission wires W1 and W2 and the resonance wires W3 and W4 according to an embodiment of the present invention. In comparison with the layout shown in FIG. 14, the shielding layer may be placed above or below the transmission wires W1/W2 and the resonance wires W3/W4. Furthermore, the shielding layer may be added into the layout shown in FIG. 15, as shown in FIG. 17.

Figure 18:
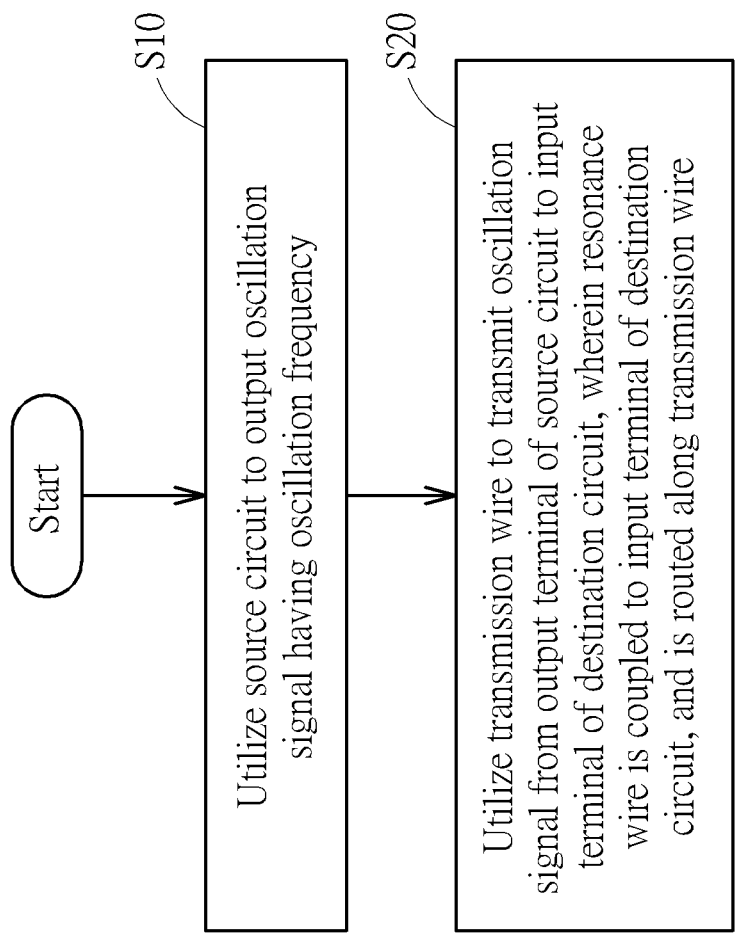
FIG. 18 is a diagram illustrating a working flow of a method for reducing power consumption of signal transmission in an electronic device according to an embodiment of the present invention.

FIG. 18 is a diagram illustrating a working flow of a method for reducing power consumption of signal transmission in an electronic device (e.g., the electronic device 10 shown in FIG. 1) according to an embodiment of the present invention. It should be noted that the working flow shown in FIG. 18 is for illustrative purposes only, and it is not meant to be a limitation of the present invention. One or more steps may be added, deleted or modified in the working flow shown in FIG. 18 if a same result can be obtained. In addition, these steps do not have to be executed in the exact order shown in FIG. 18.

In Step S10, the electronic device may utilize a source circuit of the electronic device to output an oscillation signal having an oscillation frequency.

In Step S20, the electronic device may utilize at least one transmission wire of the electronic device to transmit the oscillation signal from at least one output terminal of the source circuit to at least one input terminal of a destination circuit of the electronic device, wherein at least one resonance wire of the electronic device is coupled to the at least one input terminal of the destination circuit, and it is routed along the at least one transmission wire.

Figure 19:
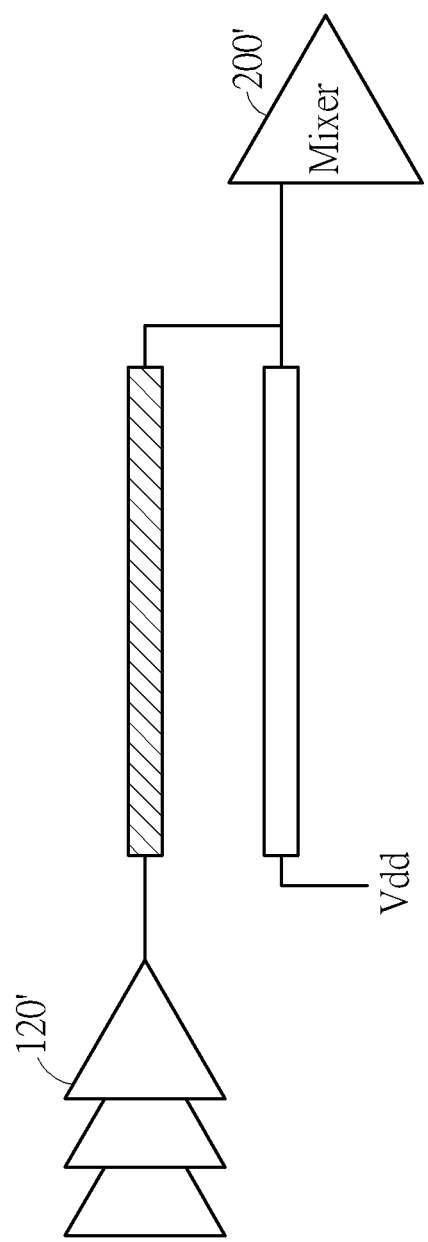
FIG. 19 is a diagram illustrating a single-ended architecture according to an embodiment of the present invention.

It should be noted that the above embodiments take the differential architecture of the electronic device 10 for illustrative purpose only, and it is not meant to be a limitation of the present invention. For example, an alternative design of the electronic device 10 may be implemented with a single-ended architecture. As shown in FIG. 19, each of the buffer circuit 120 and the mixer 200 may be replaced with a single-ended version thereof such as a buffer circuit 120' and a mixer 200', and the transmission wire W2 and the resonance wire W4 may be omitted. In addition, the above embodiments take 4-wire architecture for illustrative purposes only, and this 4-wire architecture is not meant to be a limitation of the present invention. In some embodiment, different numbers of resonance wires can be adopted if needed (e.g., to meet the requirement of resonant conditions).

To summarize, the embodiments of the present invention configure the resonance wire, which are backward routed along the transmission wire, to provide an inductance for generating the effect of the resonant tank. Thus, the voltage swing of the oscillation signal transmitted on the transmission wire can be increased for a fixed power consumption of a buffer, and power consumption for driving the oscillation signal can be saved with a fixed voltage swing requirement. In addition, the resonance wire placed along the transmission wire will not greatly occupy circuit area, and magnetic interference can be avoided. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a source circuit, configured to output an oscillation signal having an oscillation frequency;
   a destination circuit, configured to receive the oscillation signal;
   at least one transmission wire, coupled between at least one output terminal of the source circuit and at least one input terminal of the destination circuit, configured to transmit the oscillation signal from the source circuit to the destination circuit; and
   at least one resonance wire, coupled to the at least one input terminal of the destination circuit, routed along the at least one transmission wire.

2. The electronic device of claim 1, wherein a capacitance on the at least one input terminal of the destination circuit and an inductance introduced by the at least one resonance wire form a resonant tank corresponding to the oscillation frequency.

3. The electronic device of claim 1, wherein the source circuit comprises:
an oscillator, configured to generate the oscillation signal; and
a buffer circuit, coupled to the oscillator, configured to drive the oscillation signal on the at least one transmission wire.

4. The electronic device of claim 1, wherein the destination circuit comprises:
a mixer, configured to perform up-conversion or down-conversion according to the oscillation signal.

5. The electronic device of claim 1, wherein the at least one transmission wire is partially or completely parallel to the at least one resonance wire.

6. The electronic device of claim 1, wherein a length of the at least one transmission wire is identical to a length of the at least one resonance wire.

7. The electronic device of claim 1, wherein a length of the at least one transmission wire is different from a length of the at least one resonance wire.

8. The electronic device of claim 1, wherein a first end of the at least one resonance wire is coupled to the at least one input terminal of the destination circuit, and a second end of the at least one resonance wire is coupled to a reference voltage terminal.

9. The electronic device of claim 1, wherein a shielding layer is placed above or below the at least one transmission wire and the at least one resonance wire.

10. The electronic device of claim 1, wherein a first segment of the at least one resonance wire is routed on a first side of the at least one transmission wire, and a second segment of the at least one resonance wire is routed on a second side of the at least one transmission wire.

11. The electronic device of claim 1, wherein the at least one transmission wire comprises a first transmission wire and a second transmission wire, and the at least one resonance wire comprises a first resonance wire and a second resonance wire, wherein the first resonance wire is routed along the first transmission wire, and the second resonance wire is routed along the second transmission wire.

12. A method for reducing power consumption of signal transmission in an electronic device, comprising:
utilizing a source circuit of the electronic device to output an oscillation signal having an oscillation frequency; and
utilizing at least one transmission wire of the electronic device to transmit the oscillation signal from at least one output terminal of the source circuit to at least one input terminal of a destination circuit of the electronic device;
wherein at least one resonance wire of the electronic device is coupled to the at least one input terminal of the destination circuit, and is routed along the at least one transmission wire.

13. The method of claim 12, wherein a capacitance on the at least one input terminal of the destination circuit and an inductance introduced by the at least one resonance wire form a resonant tank corresponding to the oscillation frequency.

14. The method of claim 12, wherein utilizing the source circuit to output the oscillation signal comprising:
utilizing an oscillator of the source circuit to generate the oscillation signal; and
utilizing a buffer circuit of the source circuit to drive the oscillation signal on the at least one transmission wire.

15. The method of claim 12, further comprising:
utilizing a mixer of the destination circuit to perform up-conversion or down-conversion according to the oscillation signal.

16. The method of claim 12, wherein the at least one transmission wire is partially or completely parallel to the at least one resonance wire.

17. The method of claim 12, wherein a first end of the at least one resonance wire is coupled to the at least one input terminal of the destination circuit, and a second end of the at least one resonance wire is coupled to a reference voltage terminal.

18. The method of claim 12, wherein a shielding layer is placed above or below the at least one transmission wire and the at least one resonance wire.

19. The method of claim 12, wherein a first segment of the at least one resonance wire is routed on a first side of the at least one transmission wire, and a second segment of the at least one resonance wire is routed on a second side of the at least one transmission wire.

20. The method of claim 12, wherein the at least one transmission wire comprises a first transmission wire and a second transmission wire, and the at least one resonance wire comprises a first resonance wire and a second resonance wire, wherein the first resonance wire is routed along the first transmission wire, and the second resonance wire is routed along the second transmission wire.

* * * * *